United States Patent
Yang et al.

(10) Patent No.: US 12,189,336 B2
(45) Date of Patent: Jan. 7, 2025

(54) CGH GENERATOR AND DISPLAY APPARATUS INCLUDING THE SAME

(71) Applicant: SAMSUNG ELECTRONICS CO., LTD., Suwon-si (KR)

(72) Inventors: Daeho Yang, Suwon-si (KR); Hongseok Lee, Seoul (KR); Wontaek Seo, Yongin-si (KR); Jungkwuen An, Yongin-si (KR); Jong-Young Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 561 days.

(21) Appl. No.: 17/516,142

(22) Filed: Nov. 1, 2021

(65) Prior Publication Data

US 2022/0357703 A1 Nov. 10, 2022

(30) Foreign Application Priority Data

May 4, 2021 (KR) ........................ 10-2021-0058123

(51) Int. Cl.
*G03H 1/08* (2006.01)
*G02B 27/01* (2006.01)
*G03H 1/22* (2006.01)

(52) U.S. Cl.
CPC ....... *G03H 1/0866* (2013.01); *G02B 27/0172* (2013.01); *G03H 1/2294* (2013.01); *G02B 2027/0174* (2013.01); *G02B 2027/0178* (2013.01); *G03H 2222/12* (2013.01); *G03H 2225/34* (2013.01)

(58) Field of Classification Search
None
See application file for complete search history.

(56) References Cited

U.S. PATENT DOCUMENTS

| 9,727,970 | B2 | 8/2017 | Song et al. |
| 2013/0335795 | A1 | 12/2013 | Song et al. |
| 2015/0365577 | A1 | 12/2015 | Watnik et al. |
| 2019/0310585 | A1 | 10/2019 | Zschau |
| 2020/0033803 | A1* | 1/2020 | Christmas ............ G03H 1/2294 |
| 2020/0192288 | A1 | 6/2020 | Alon-Braitbart et al. |

(Continued)

FOREIGN PATENT DOCUMENTS

| GB | 2576552 A | 2/2020 |
| KR | 10-2016-0017489 A | 2/2016 |
| KR | 10-2016-0018669 A | 2/2016 |

OTHER PUBLICATIONS

Communication dated Jun. 30, 2022, issued by the European Patent Office in counterpart European Application No. 21218469.1.

(Continued)

*Primary Examiner* — Robert E. Tallman
(74) *Attorney, Agent, or Firm* — Sughrue Mion, PLLC

(57) ABSTRACT

A holographic display apparatus includes: a light source; a spatial light modulator configured to modulate light from the light source according to an image to be displayed on an object plane; and a processor configured to generate a computer generated hologram (CGH) in which a phase value of hologram data to be displayed on a reference plane of the spatial light modulator is 0, the processor being configured to apply a light modulation signal based on the CGH to the spatial light modulator.

25 Claims, 16 Drawing Sheets

(56) References Cited

U.S. PATENT DOCUMENTS

2022/0057750 A1    2/2022  Yang et al.

OTHER PUBLICATIONS

Cho et al., "Computational multi-layered holographic display featuring effective resolution enhancement," Dissertation, Department of Electrical Engineering and Computer Science, College of Engineering, Seoul National University, Feb. 2020, Total 105 pages XP055928567.
Pang et al., "Accurate Hologram Generation Using Layer-Based Method and Iterraive Fourier Transform Algorithm," IEEE Photonics Journal vol. 9, No. 1, Feb. 2017, Total 9 pages, XP055393047.
Shimobaba et al., "Random phase-free computer holography and its applications," Proc. of SPIE; vol. 9867, Jun. 2016, Total 7 pages, XP060069043.
Chang et al., "Toward the next-generation VR/AR optics: a review of holographic near-eye displays from a human-centric perspective," OPTICA, vol. 7, No. 11, Nov. 2020, pp. 1563-1578, XP055860783.

\* cited by examiner

CGH GENERATOR AND DISPLAY APPARATUS INCLUDING THE SAME

CROSS-REFERENCE TO RELATED APPLICATION

This application is based on and claims priority under 35 U.S.C. § 119 to Korean Patent Application No. 10-2021-0058123, filed on May 4, 2021, in the Korean Intellectual Property Office, the disclosure of which is incorporated by reference herein in its entirety.

BACKGROUND

1. Field

The disclosure relates to a computer-generated hologram (CGH) generator and a display apparatus including the same.

2. Description of Related Art

Holography is a type of three-dimensional (3D) spatial representation technique with no viewing limit and almost no 3D fatigue via 3D spatial representation of an object through an adjustment of an amplitude and a phase of light. For a holographic display, a hologram on which an interference pattern of an object wave and a reference wave is recorded may be formed, and when the reference wave is irradiated onto this hologram, the object wave may be reproduced, so that an object may be represented on a 3D space. Recently, for forming the interference pattern, rather than using the interference of the object wave and the reference wave, a computer-generated hologram (CGH), which is formed by using an arithmetic calculation, has been used.

The CGH may include information about an amplitude and a phase that are to be assigned to each location of a spatial light modulator. However, there is difficulty in accurately representing a predetermined amplitude and phase in an amplitude spatial light modulator that is generally used.

SUMMARY

Provided is a holographic display apparatus including a computer-generated hologram (CGH) generator.

Additional aspects will be set forth in part in the description which follows and, in part, will be apparent from the description, or may be learned by practice of embodiments of the disclosure.

In accordance with an aspect of the disclosure, a holographic display apparatus includes a light source; a spatial light modulator configured to modulate light from the light source according to an image to be displayed on an object plane; and a processor configured to generate a computer generated hologram (CGH) in which a phase value of hologram data to be displayed on a reference plane of the spatial light modulator is 0, the processor being configured to apply a light modulation signal based on the CGH to the spatial light modulator.

The spatial light modulator may include an amplitude modulation spatial light modulator.

The object plane may include a plurality of object planes obtained by segmenting an object image in a depth direction, and wherein the processor is further configured to generate the CGH by propagating a complex function corresponding to a respective hologram image to be displayed on each of the plurality of object planes toward the reference plane of the spatial light modulator.

The processor may be further configured to repeatedly change a phase value of hologram image data of a hologram image to be displayed on the object plane and search for a value via which the phase of the hologram data on the reference plane of the spatial light modulator becomes 0.

The processor may be further configured to use a gradient descent method to repeatedly change the phase value of the hologram image data to be displayed on the object plane and search for the value via which the phase of the hologram data on the reference plane of the spatial light modulator becomes 0.

The processor may be further configured to configure a first complex function including an amplitude A corresponding to the hologram image to be displayed on the object plane and an arbitrary phase value $\varphi$ to be assigned to the amplitude A; calculate a second complex function obtained by propagating, toward the reference plane, the first complex function; extract an imaginary part of the second complex function; calculate a loss value indicating a difference between the imaginary part and 0; and correct the phase value $\varphi$ such that the loss value is minimized.

The correcting of the phase value $\varphi$ may be repeatedly performed according to a gradient descent method.

The processor may be further configured to calculate a third complex function obtained by propagating, toward the reference plane, a complex function in which a final phase value $\varphi$ determined by correcting the phase value $\varphi$ a plurality of times is assigned to the amplitude A; and extract a real part from the third complex function.

The processor may be further configured to convert the real part into the light modulation signal and apply the light modulation signal to the spatial light modulator.

The processor may be further configured to repeatedly change an amplitude value of the hologram data to be displayed on the reference plane; obtain a complex function by propagating the repeatedly changed amplitude value toward the object plane; and search for a value via which an amplitude of the complex function becomes equal to an amplitude value of hologram image data to be displayed on the object plane.

The processor may be further configured to use a gradient descent method to repeatedly change the amplitude value of the hologram data to be displayed on the reference plane obtain the complex function by propagating the repeatedly changed amplitude value toward the object plane, and search for the value via which the amplitude of the complex function becomes equal to the amplitude value of the hologram image data to be displayed on the object plane.

The processor may be further configured to configure a fourth complex function including an arbitrary amplitude A' as the hologram data to be displayed on the reference plane; calculate a fifth complex function obtained by propagating, toward the object plane, the fourth complex function in which a phase value of 0 is assigned to the arbitrary amplitude A'; calculate a loss value with respect to a difference between an amplitude of the fifth complex function and the amplitude value of the hologram image data to be displayed on the object plane; and correct the arbitrary amplitude A' such that the loss value is minimized.

The correcting of the amplitude value may be repeatedly performed according to a gradient descent method.

The processor may be further configured to convert a final amplitude value A' determined by correcting the arbitrary amplitude A' a plurality of times into the light modulation signal and apply the light modulation signal to the spatial light modulator.

The processor may be further configured to search for a complex function of the object plane, via which the phase of the hologram data to be displayed on the reference plane of the spatial light modulator becomes 0, according to an iterative Fourier transform algorithm (iFTA) method.

The processor may be further configured to configure an arbitrary first complex function as hologram data to be displayed on the object plane; calculate a second complex function by changing an amplitude of the arbitrary first complex function to a predetermined amplitude A and propagating the changed arbitrary first complex function toward the reference plane; calculate a third complex function by changing a phase of the second complex function to 0 and propagating the second complex function toward the object plane; and compare an amplitude of the third complex function with the predetermined amplitude A.

The processor may be further configured to, when the amplitude of the third complex function is different from the predetermined amplitude A, use the third complex function as another first complex function and perform a calculation of another second complex function and a calculation of another third complex function.

The processor may be further configured to, when the amplitude of the third complex function is equal to the predetermined amplitude A, calculate the complex function obtained by propagating the third complex function toward the reference plane.

The processor may be further configured to convert a real part of the calculated complex function into the light modulation signal and apply the light modulation signal to the spatial light modulator.

The holographic display apparatus may further include a field lens arranged between the spatial light modulator and the object plane.

The holographic display apparatus may include a glasses-type apparatus.

An electronic device may include the holographic display apparatus of an above-noted aspect of the disclosure.

An augmented reality device may include the holographic display apparatus of an above-noted aspect of the disclosure; and an optical combiner configured to combine image light via the holographic display apparatus with ambient light and provide the combined light to an eye of a user.

The optical combiner may be transparent with respect to the ambient light incident in a first direction and is configured to change a path of the image light, which is incident in a second direction that is different from the first direction, to a direction parallel to the first direction.

In accordance with an aspect of the disclosure, a holographic display apparatus includes a coherent light source; an amplitude modulation spatial light modulator (SLM) configured to modulate coherent light incident from the coherent light source; and a processor configured to receive object amplitude data of an image to be displayed at an object plane; calculate object phase data of the image to be displayed at the object plane such that reference phase data of a computer generated hologram (CGH) applied to the amplitude modulation SLM is substantially equal to zero; and generate the CGH comprising the reference phase data; and apply the CGH to the amplitude modulation SLM to display the image at the object plane.

The calculating the object phase data may include generating a first complex function comprising an initial arbitrary value as the object phase data; and performing an iterative process including generating a second complex function by propagating the first complex function to a reference plane of the amplitude modulation SLM; determining whether phase data of the second complex function is substantially equal to zero; based on the phase data of the second complex function not being substantially equal to zero, generating a third complex function comprising corrected phase data based on the phase data of the second complex function and repeating the iterative process using the third complex function as the first complex function.

The iterative process may further include, based on the phase data of the second complex function being substantially equal to zero, determining the phase data of the most recently generated second complex function as the object phase data.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
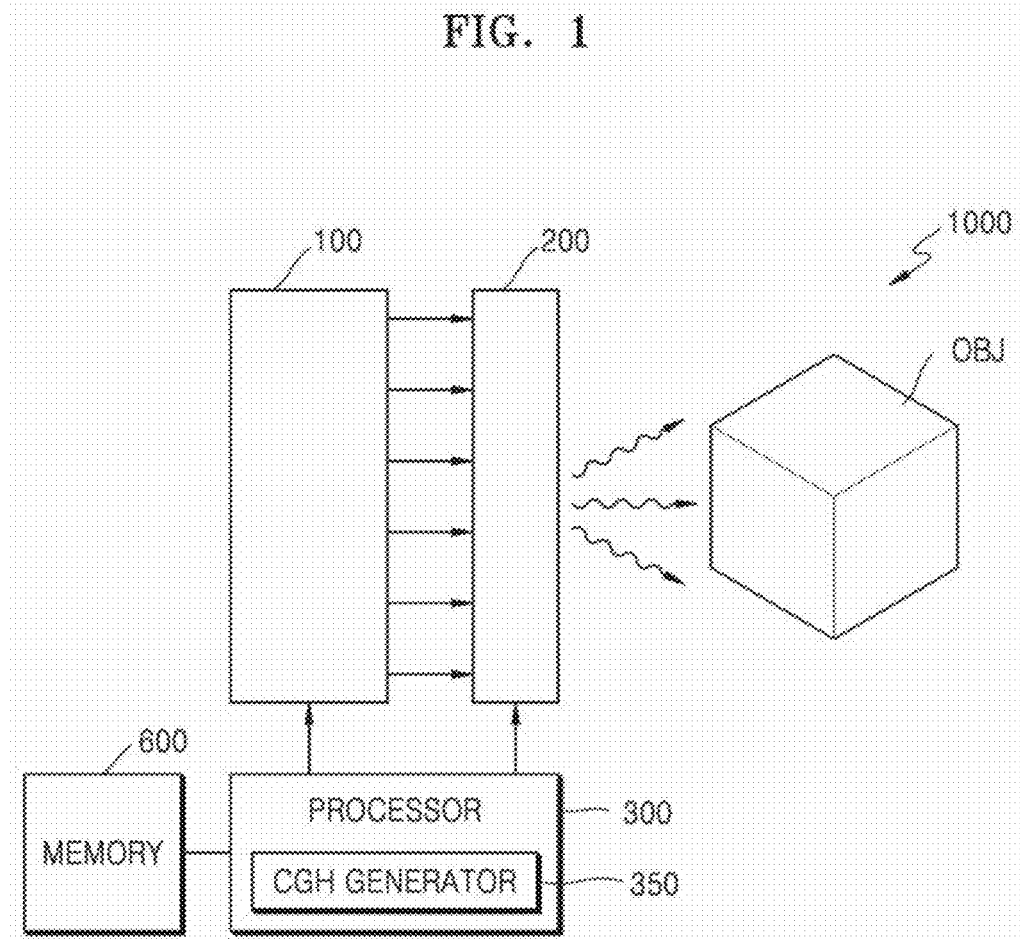
FIG. 1 is a schematic conceptual diagram of a structure of a holographic display apparatus according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail by referring to the accompanying drawings. The embodiments described hereinafter are only examples, and various modifications may be made based on the embodiments. In the drawings, the same reference numerals denote the same elements and sizes of elements may be exaggerated for clarity and convenience of explanation.

Hereinafter, it will be understood that when an element is referred to as being "on" or "above" another element, the element can be directly over or under the other element and directly on the left or on the right of the other element, or intervening elements may also be present therebetween.

Although the terms "first," "second," etc. may be used herein to describe various elements, these terms are only used to distinguish one element from another. These terms are not used to define differences of materials or structures between the elements.

As used herein, the singular terms "a" and "an" are intended to include the plural forms as well, unless the context clearly indicates otherwise. It will be further understood that when a part "includes" or "comprises" an element, unless otherwise defined, the part may further include other elements, not excluding the other elements.

Also, the terms such as " . . . unit," "module," or the like used in the specification indicate a unit, which processes at least one function or motion, and the unit may be implemented by hardware or software, or by a combination of hardware and software.

The term "the" and other equivalent determiners may correspond to a singular referent or a plural referent.

Unless orders of operations included in a method are specifically described or there are contrary descriptions, the operations may be performed according to appropriate orders. The use of all example terms (e.g., etc.) are merely for describing the disclosure in detail and the disclosure is not limited to the examples and the example terms.

FIG. 1 is a schematic conceptual diagram of a structure of a holographic display apparatus 1000 according to an embodiment.

The holographic display apparatus 1000 may include a light source portion 100, a spatial light modulator (SLM) 200 configured to modulate light from the light source portion 100 according to an image signal, and a processor 300 including a computer-generated hologram (CGH) generator 350 configured to generate a CGH. Also, the holographic display apparatus 1000 may further include a memory 600.

The light source portion 100 may provide a coherent light beam to the SLM 200. The light source portion 100 may include a light-emitting diode (LED), a laser diode (LD), an organic light-emitting diode (OLED), a vertical cavity surface emitting laser (VCSEL), etc., as a light source providing coherent light and may include various light sources capable of providing light having a predetermined degree of spatial coherence to the SLM 200. Also, the light source portion 100 may include a collimating lens configured to collimate light emitted from the light source, a beam expander configured to expand the light into the form of surface light, or the like.

The SLM 200 may include various amplitude modulation SLMs configured to modulate an amplitude of incident light. For example, the SLM 200 may include a liquid crystal on silicon (LCoS) device or a liquid crystal display (LCD). Also, a semiconductor modulator based on various compound semiconductors, a digital micro-mirror device (DMD), etc. may be used as the SLM 200. The SLM 200 may be referred to as an amplitude SLM, because the SLM 200 may mainly modulate the amplitude of the incident light. However, it is generally the case that unintended slight phase modulation may be performed by the amplitude modulation SLM. FIG. 1 illustrates that the SLM 200 is a transmissive-type. However, it is only an example, and the SLM 200 may be a reflective type.

The processor 300 may perform general functions for controlling the holographic display apparatus 1000 and may include the CGH generator 350 configured to generate a CGH that is to be provided to the SLM 200. For example, the processor 300 may generate the hologram to be provided to the SLM 200 by executing a CGH generation program stored in a memory.

The processor 300 may correspond to processors included in various types of computing devices, such as a personal computer (PC), a server, a television (TV), a mobile device (a smartphone, a tablet device, etc.), an embedded device, an autonomous vehicle, a wearable device, an augmented reality (AR) device, an Internet of Things (IoT) device, etc. For example, the processor 300 may correspond to processors, such as a central processing unit (CPU), a graphics processing unit (GPU), an application processor (AP), a neural processing unit (NPU), etc., but is not limited thereto.

The CGH generator 350 may generate the CGH to be provided to the SLM 200. The hologram generated by the CGH generator 350 is a hologram, a phase of which is 0 on a reference plane of the SLM 200, and hereinafter, such hologram may be interchangeably expressed by the terms, such as an amplitude hologram, an amplitude-only hologram, and an amplitude-only CGH. The amplitude hologram generated by the CGH generator 350 may be suitable to be applied to the amplitude SLM. In the case of an amplitude-phase SLM configured to modulate an amplitude and a phase, it is generally known that phase modulation efficiency is very low. To compensate for the incomplete phase modulation, an additional optical system, such as a spatial filter, etc., may be used for correction, which may cause bulkiness of an optical system. According to an embodiment, lest it is required to compensate for the incomplete phase modulation, a method of forming an amplitude-only CGH which is suitable for the amplitude SLM may be provided.

In the amplitude-only CGH generated according to an embodiment, a phase may not be precisely 0. An optimization method for making the phase as close to 0 as possible may be used. However, according to an image to be displayed on an object plane and a depth location of the object plane, the amplitude-only CGH may be formed to have a minimum phase value that is close to 0.

The processor 300 may convert an amplitude hologram generated by the CGH generator 350 into a light modulation signal suitable for the SLM 200. The amplitude hologram formed by the CGH generator 350 may include information indicating a brightness of an interference pattern assigned according to each location of a reference plane of the SLM 200, that is, x and y coordinates, and an appropriate electrical signal (e.g., the light modulation signal) to represent this interference pattern in the SLM 200 may be applied to the SLM 200.

When the processor 300 applies, to the SLM 200, the light modulation signal based on the CGH, and coherent light is provided to the SLM 200 from the light source portion 100, a 3D image with respect to an object OBJ may be reproduced on a predetermined location of a space.

The memory 600 may be hardware in which various data and code of programs required for an operation of the holographic display apparatus 1000 are stored. For example, the memory 600 may store the code of the programs for executing an operation of the CGH generator 350 and various data required for an operation process of the CGH generator 350. Also, the memory 600 may store various applications to be driven by the processor 300, for example, a hologram reproducing application, a web-browsing application, a game application, a video application, etc.

The memory 600 may include at least one of a volatile memory and a nonvolatile memory. The nonvolatile memory may include read-only memory (ROM), programmable ROM (PROM), electrically PROM (EPROM), electrically erasable and PROM (EEPROM), flash memory, phase-change random-access memory (PRAM), magnetic random-access memory (MRAM), resistive random-access memory (RRAM), ferroelectric random-access memory (FRAM), etc. The volatile memory may include dynamic random-access memory (DRAM), static random-access memory (SRAM), synchronous DRAM (SDRAM), PRAM, MRAM, RRAM, FRAM, etc. According to an embodiment, the memory 600 may be realized as at least one of a hard disk drive (HDD), a solid state drive (SSD), compact flash (CF) memory, secure digital (SD) memory, micro-SD memory, mini-SD memory, extreme digital (xD) memory, and a memory stick.

The holographic display apparatus 1000 may further include a field lens. For example, the field lens may be arranged on a front side of the SLM 200 to adjust a spatial location to reproduce the hologram image.

Figure 2:
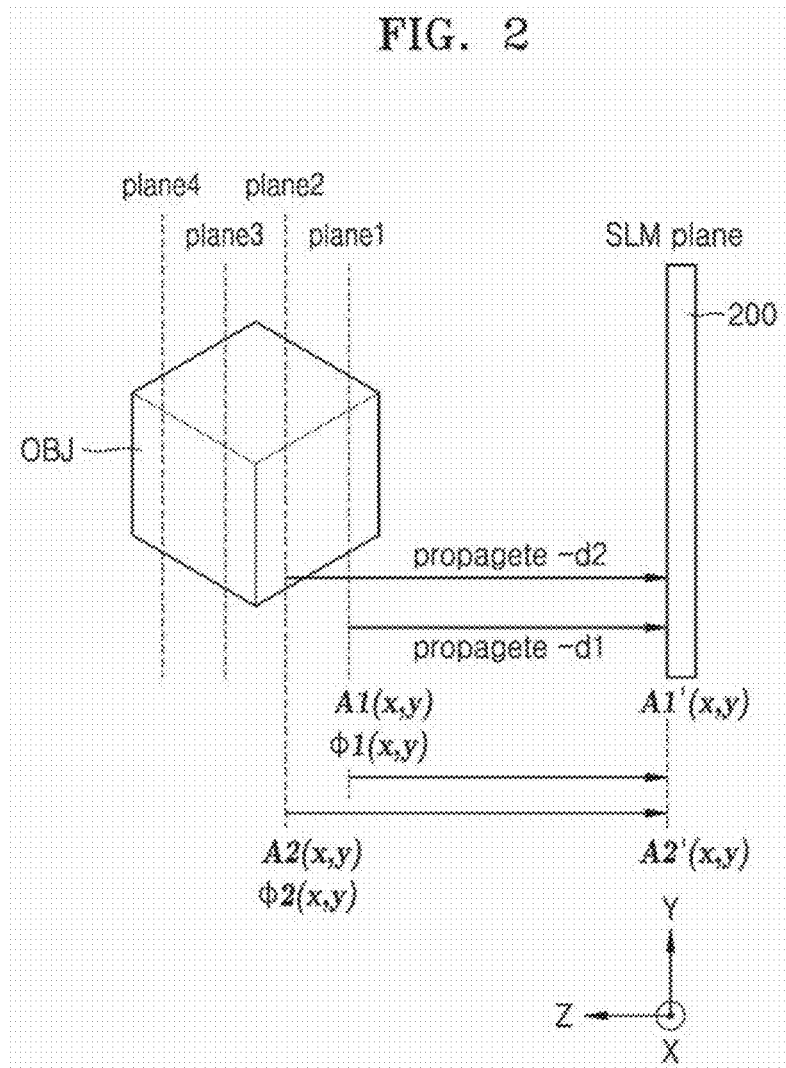
FIGS. 2 and 3 are conceptual diagrams for describing a principle by which a CGH generator included in a holographic display apparatus forms a computer-generated hologram (CGH) according to an embodiment.
Figure 3:
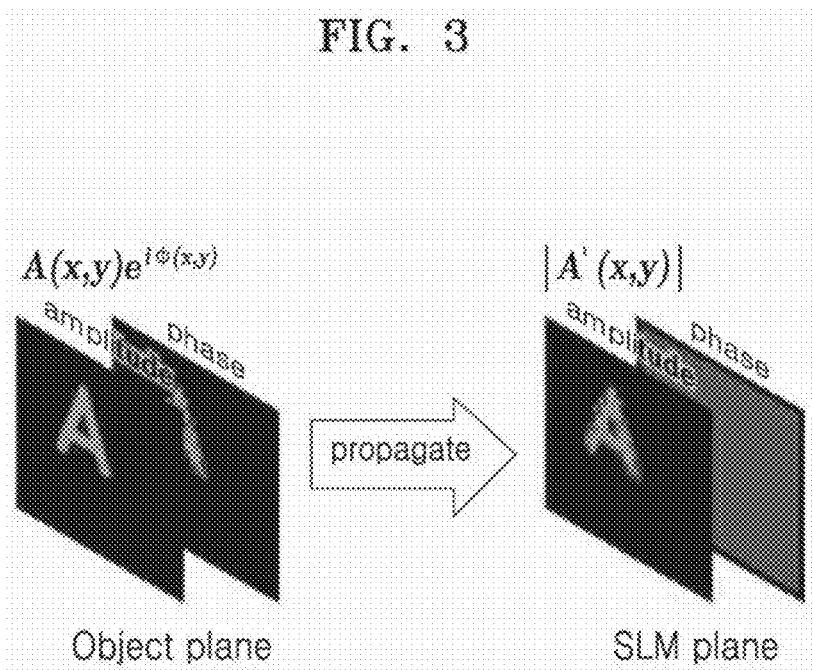

FIGS. 2 and 3 are conceptual diagrams for describing a principle of forming a CGH via a CGH generator included in a holographic display apparatus according to an embodiment.

To form the CGH, a layer-based method may be considered, whereby an object for reproduction is segmented into a plurality of objects in a depth direction and each segment unit is treated as a layer. As illustrated in FIG. 2, complex functions corresponding to image data of a plurality of object planes plane 1, plane 2, plane 3, and plane 4 may be considered. The number of depth layers may be a predetermined number, which may be changed according to a user's configuration. For example, the number of depth layers may be 256 or another number. To form the CGH, the complex function corresponding to the image data of each depth layer may be propagated toward a reference plane SLM plane of the SLM 200. The image data of each object plane may be represented by an amplitude component and a phase component. For example, when the depth direction is a Z direction, the image data of the object plane plane 1 may be represented by an amplitude A1($x, y$) and a phase $\varphi1(x,y)$, and the image data of the object plane plane 2 may be represented by an amplitude A2($x, y$) and a phase $\varphi2(x,y)$. A complex function obtained by propagating the complex function corresponding to the image data toward the reference plane SLM plane may become a CGH that is to be provided to the SLM 200 as a light modulation signal. For example, the complex function corresponding to the object plane plane 1 may be propagated by a distance $-d1$ as A1'($x,y$), and the complex function corresponding to the object plane plane 2 may be propagated by a distance $-d2$ as A2'($x,y$), to obtain the CGH containing the image information of the corresponding layers. The CGH generator 350 included in the holographic display apparatus 1000 according to an embodiment may search for phases of the object planes (plane 1, plane 2, plane 3, and plane 4) to form a hologram, a phase of which is 0 on the reference plane of the SLM 200 (SLM plane), that is, an amplitude-only hologram. This method is based on the aspect that when image data of an object has the same amplitude, that is, has the same amplitude information, the image data is viewed by a human eye as the same, even when an arbitrary phase is assigned to the image data. Thus, the amplitude-only hologram, which is suitable to be assigned to the SLM 200 that is the amplitude modulation SLM, may be generated, by searching for and configuring a phase value of an object plane such that the phase is 0 on the reference plane (SLM plane) and only an amplitude remains on the reference plane (SLM plane) when a complex function corresponding to the object plane is propagated toward the reference plane (SLM plane). As illustrated in FIG. 3, based on a phase $\varphi(x, y)$ assigned as an appropriate value to the image data of the object plane, only a predetermined amplitude A'(x,y) may be left when a complex function A(x,y)$e^{j\varphi(x,y)}$ is propagated toward the reference plane (SLM plane). After such a hologram is assigned to the SLM 200, hologram image data reproduced on the object plane by the SLM 200, to which the hologram is assigned, may include the amplitude A(x,y) and the phase $\varphi(x, y)$, and an image corresponding to the amplitude A(x,y) may be recognized by a human eye regardless of the phase.

Figure 4:
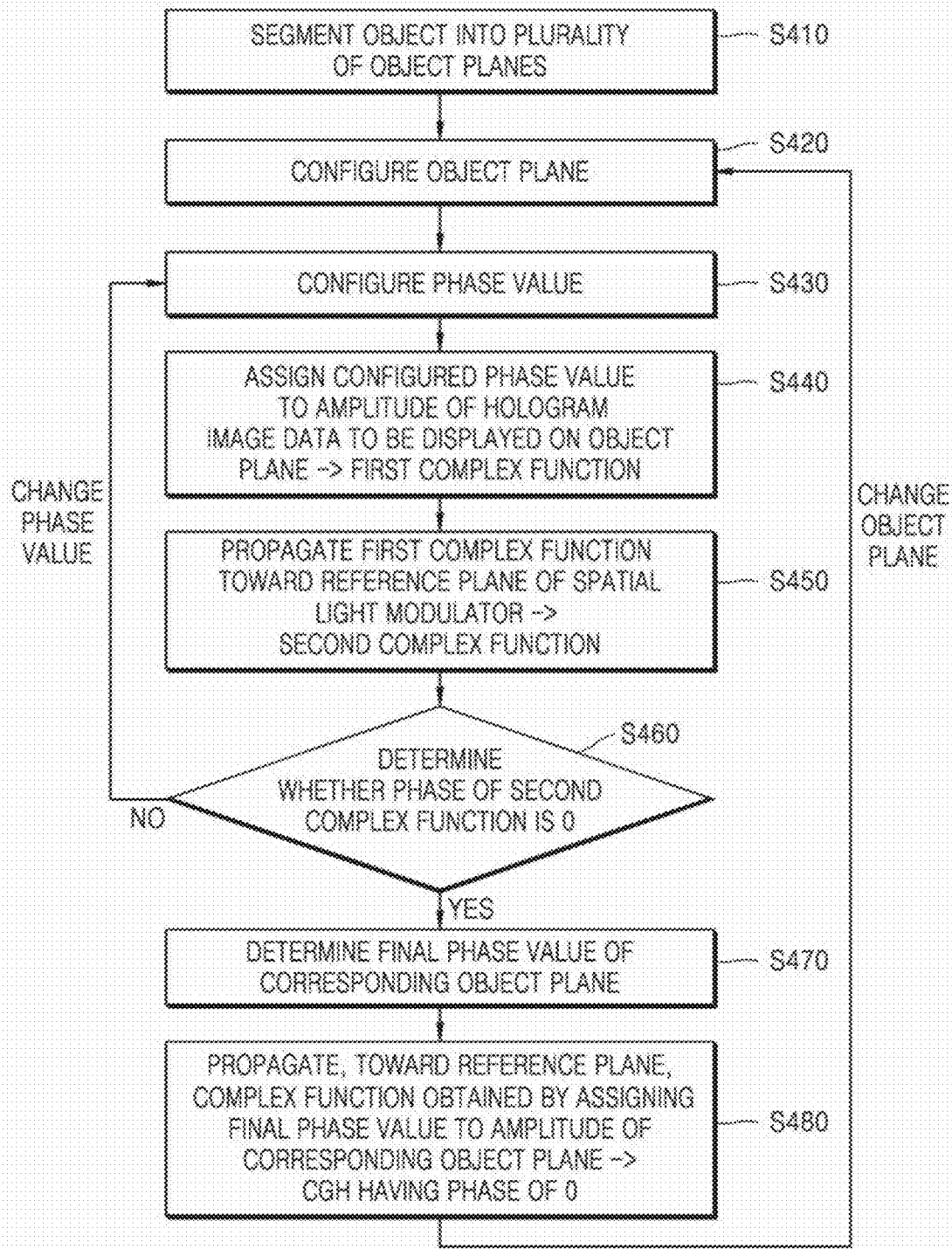
FIG. 4 is a flowchart of a process by which a CGH generator included in a holographic display apparatus generates a CGH according to an embodiment.
Figure 5:
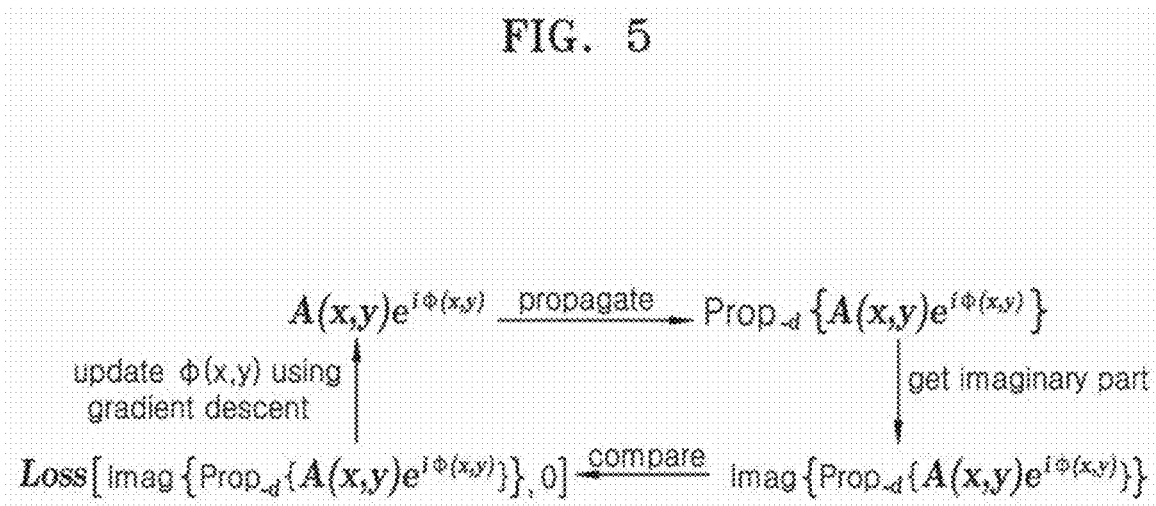
FIG. 5 is a conceptual diagram illustrating, by using a formula, a process of repeating the process of FIG. 4 by changing a phase value.

FIG. 4 is a flowchart of a process that a CGH generator included in a holographic display apparatus generates a CGH, according to an embodiment, and FIG. 5 is a conceptual diagram illustrating, by using a formula, a process of repeating the process illustrated in the flowchart of FIG. 4 by searching for the phase value.

The process of generating the CGH according to an embodiment may include a process of calculating a phase value on an object plane by using a gradient descent method.

First, an object to be reproduced may be segmented into a plurality of object planes in a depth direction (S410).

Next, one object plane may be configured (S420), and a phase value of image data of the corresponding object plane may be configured (S430). As described above, the image data of each object plane may be identified by an eye of a user via amplitude data, regardless of a phase, and the image data considered herein may be amplitude data, and a phase value configured with respect thereto may be an arbitrary value.

Next, a first complex function may be configured by assigning an arbitrarily configured phase value to hologram image data to be displayed on a corresponding object plane (S440).

Next, a second complex function obtained by propagating the first complex function toward the reference plane of the SLM 200 may be calculated (S450).

Next, whether a phase of the calculated second complex function is 0 or not may be determined (S460). Here, the phase of 0 does not denote arithmetically perfect 0.00, and a reference (e.g., a threshold) for determining an amplitude hologram, which may be assigned to the amplitude modulation SLM, may be appropriately configured.

When the phase is not 0, operations S440, S450, and S460 may be repeated by changing the phase value.

When a phase of the second complex function on the reference plane of the SLM 200 is 0, the phase value assigned in operation S430 may be determined as a final phase value (S470).

A calculation of propagating, toward the reference plane, a complex function, obtained by assigning the final phase value to an amplitude of a corresponding object plane, may be performed. The calculated complex function may include an imaginary part that is 0 or very close to 0, and by taking a real part, a (amplitude-only) CGH with a phase of 0 may be obtained (S480).

This process may be repeated by changing the object plane and may be performed with respect to all object planes.

Operations S440 through S460 of the flowchart of FIG. 4, which are repeated, may be expressed as illustrated in FIG. 5. The first complex function obtained by assigning an arbitrarily configured phase value $\varphi$ to the amplitude $A(x,y)$ of the hologram image data to be displayed on the object plane may be expressed as $A(x, y)e^{i\varphi(x,y)}$. The second complex function obtained by propagating the first complex function toward the reference plane of the SLM 200 may be expressed as $Prop_{-d}\{A(x, y)e^{i\varphi(x,y)}\}$. Here, a direction from the object plane toward the reference plane may be defined as a −Z direction. An imaginary part of the second complex function may be obtained as $Imag\{Prop_{-d}\{A(x, y)e^{i\varphi(x,y)}\}\}$, 0. A loss value obtained by comparing a phase of the second complex function with 0 may be expressed as $Loss[Imag\{Prop_{-d}\{A(x,y)e^{i\varphi(x,y)}\}\}, 0]$. The phase value $\varphi(x,y)$ may be updated to minimize the loss value. The above process may be repeated by using the updated phase value $\varphi(x,y)$.

The process of changing and searching for the final phase value may be performed by using a gradient descent method, and other various optimization methods may also be used.

Figure 6:
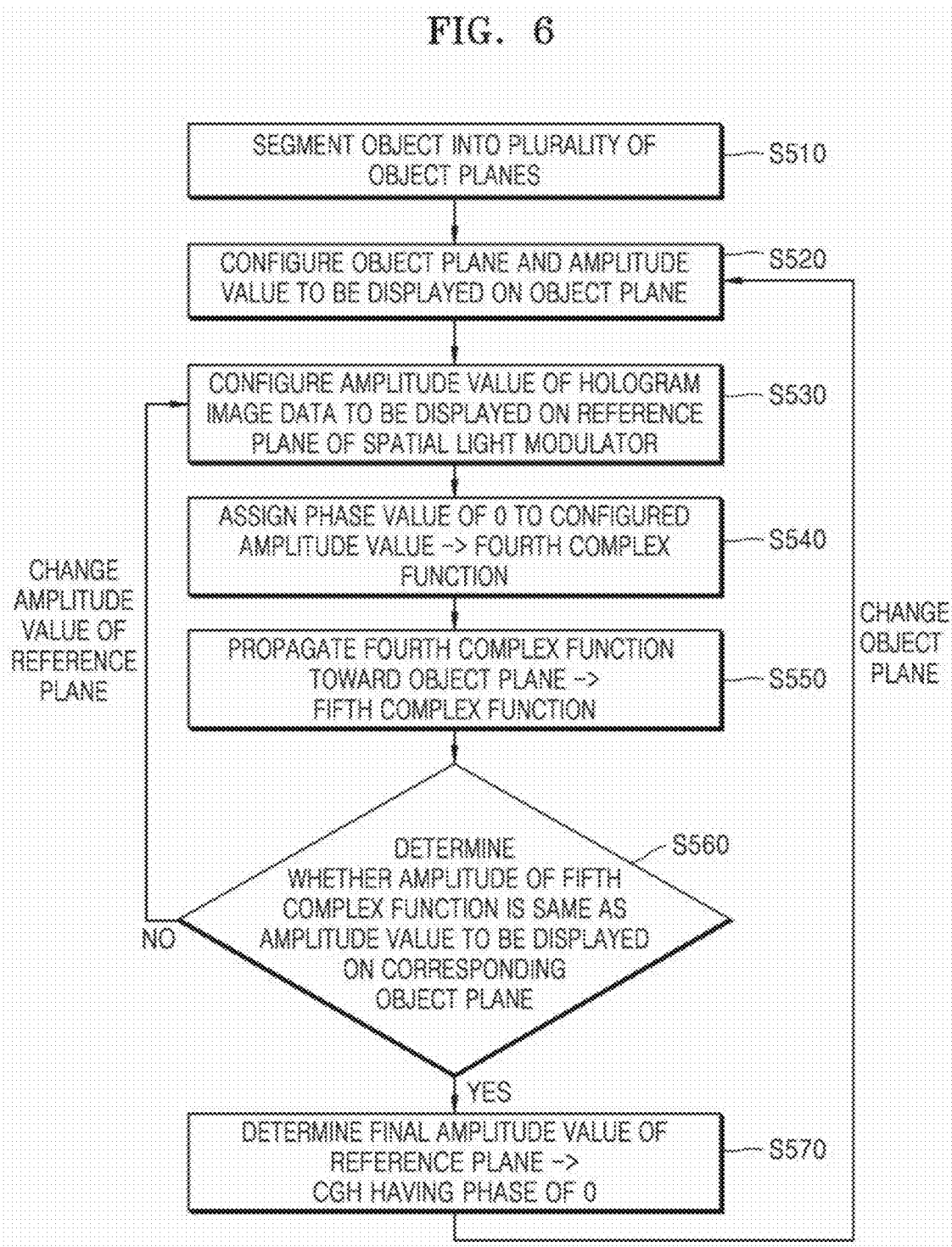
FIG. 6 is a flowchart of an example of a process by which a CGH generator included in a holographic display apparatus generates a CGH according to an embodiment.
Figure 7:
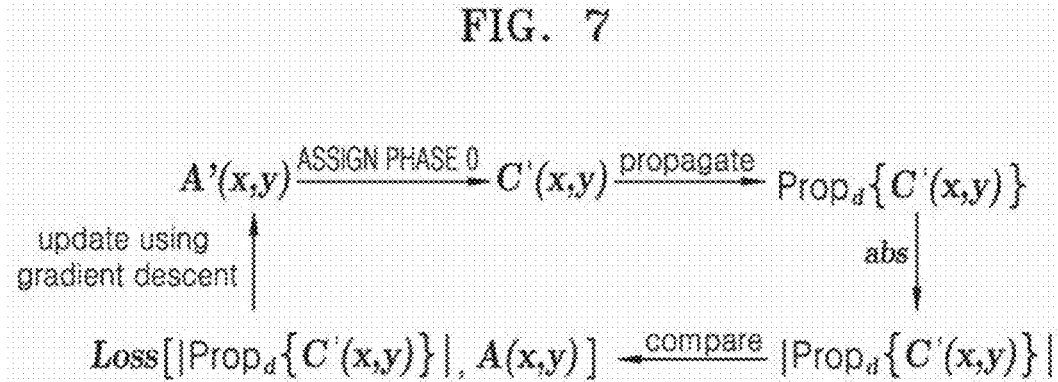
FIG. 7 is a conceptual diagram illustrating, by using a formula, a process of repeating the process of FIG. 6 by changing an amplitude value.

FIG. 6 is a flowchart of an example of a process by which a CGH generator included in a holographic display apparatus generates a CGH, according to an embodiment, and FIG. 7 is a conceptual diagram illustrating, by using a formula, a process of repeating the process of FIG. 6 by changing an amplitude value.

The process of generating the CGH according to an embodiment may include a process of calculating an amplitude value on a reference plane SLM plane by using a gradient descent method.

First, an object to be reproduced may be segmented into a plurality of object planes in a depth direction (S510).

Next, one object plane may be configured, and an amplitude value of hologram image data to be displayed on the corresponding object plane may be configured (S520). Here, the configured amplitude value may be a value determined according to the hologram image data to be displayed on the corresponding object plane.

Next, an amplitude value of the hologram image data to be displayed on the reference plane of the SLM may be configured (S530). Here, the configured amplitude value may be configured to search for a final amplitude value via which a phase of hologram data on the reference plane becomes 0, and may be initially configured as an arbitrary value.

Next, a fourth complex function may be configured by assigning a phase value of 0 to the configured amplitude value (S540).

Next, a fifth complex function may be calculated by propagating the fourth complex function toward the configured object plane (S550).

Next, whether or not an amplitude of the fifth complex function is the same as the amplitude value to be displayed on the corresponding object plane may be determined (S560). Here, that the two values are the same does not denote that a difference between the two values is arithmetically and perfectly 0.00. Based on this aspect, a reference (e.g., a threshold) for determining that an amplitude hologram which may be assigned to the amplitude modulation SLM is derived may be appropriately configured.

When it is determined that the amplitude of the fifth complex function is not the same as the amplitude value to be displayed on the corresponding object plane, operations S530, S540, S550, and S560 may be repeated by changing the amplitude value of the reference plane.

When it is determined that the amplitude of the fifth complex function is the same as the amplitude value to be displayed on the corresponding object plane, the amplitude value configured in operation S530 may be determined as a final amplitude value (S570). The determined final amplitude value may be a value searched for such that the phase of the hologram data on the reference plane becomes 0. Thus, a (amplitude-only) CGH with a phase of 0 may be formed.

This process may be repeated by changing the object plane and may be performed with respect to all object planes.

Operations S530 through S570 of FIG. 6 may be expressed as illustrated in FIG. 7. An amplitude arbitrarily configured on the reference plane may be expressed as $A'(x,y)$. Next, a fourth complex function obtained by assigning a phase of 0 to the amplitude may be expressed as $C'(x,y)$. The fifth complex function calculated by propagating the complex function $C'(x,y)$ toward the object plane by a distance d may be expressed as $Prop_d\{C'(x,y)\}$. Here, a direction from the reference plane toward the object plane may be defined as a +Z direction. An amplitude of the fifth complex function may be obtained as $|Prop_d\{C'(x,y)\}|$. A loss value obtained by comparing the amplitude ($|Prop_d\{C'(x,y)\}|$) of the fifth complex function with an amplitude $A(x,y)$ of the hologram image data to be displayed on the object plane may be expressed as $Loss[|Prop_d\{C'(x,y)\}|, A(x,y)]$. The amplitude value $A'(x,y)$ may be updated such that the loss value is minimized. The above process may be repeated by using the updated amplitude value $A'(x,y)$.

The process of changing and searching for the final amplitude value may be performed by using a gradient descent method, and other various optimization methods may also be used.

Figure 8:
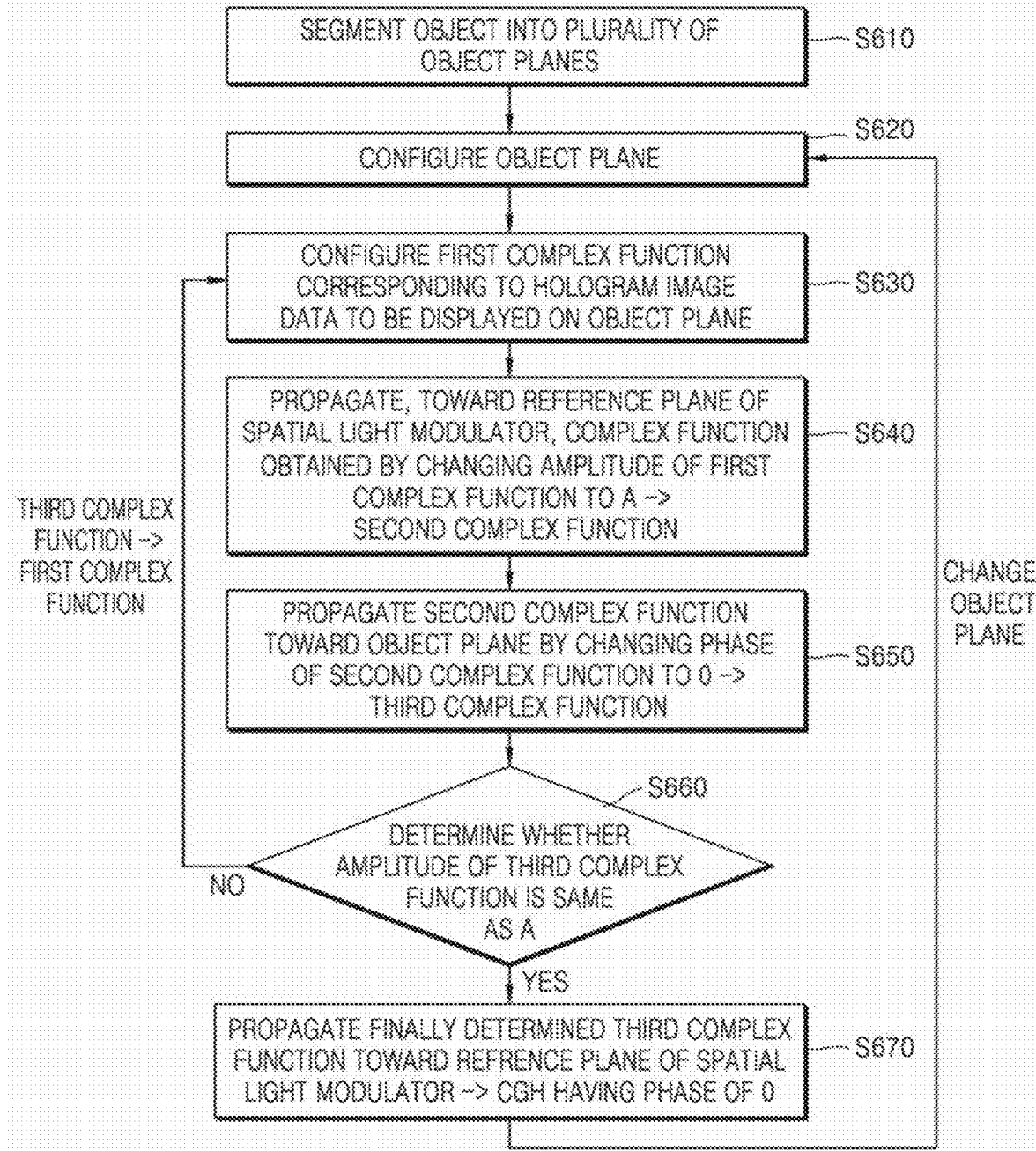
FIG. 8 is a flowchart of an example of a process by which a CGH generator included in a holographic display apparatus generates a CGH according to an embodiment.
Figure 9:
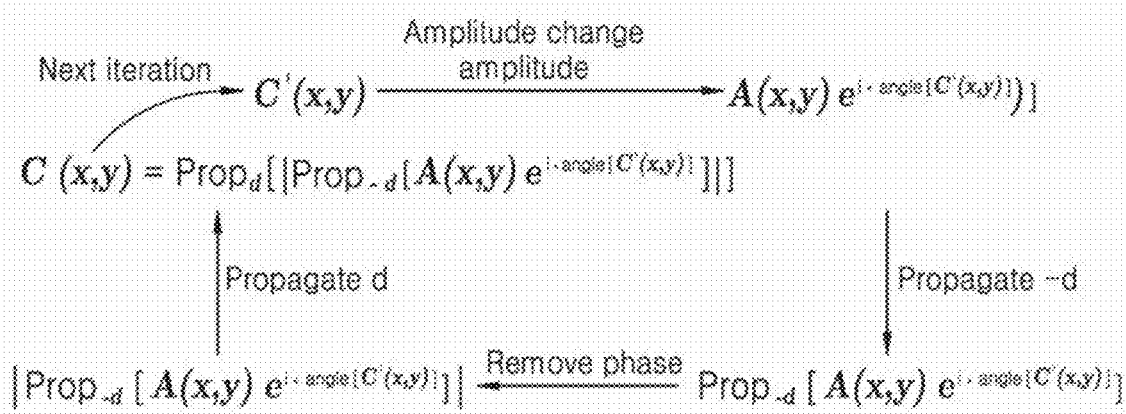
FIG. 9 is a conceptual diagram illustrating, by using a formula, a process of repeating the process of FIG. 8 by changing a first complex function.

FIG. 8 is a flowchart of an example of a process of generating a CGH via a CGH generator included in a holographic display apparatus according to an embodiment, and FIG. 9 is a conceptual diagram illustrating, by using a formula, a process of repeating the process of FIG. 8 by changing a first complex function.

The process of generating the CGH according to an embodiment may include a process of calculating a complex function corresponding to a hologram image to be displayed on an object plane, by using an iterative Fourier transform algorithm (iFTA).

First, an object to be reproduced may be segmented into a plurality of object planes in a depth direction (S610).

Next, one object plane may be configured (S620), and a first complex function corresponding to hologram image data to be displayed on the corresponding object plane may be configured (S630). The first complex function may be an arbitrary function used for searching to provide a hologram having a phase of 0 on a reference plane.

Next, a second complex function may be obtained by changing an amplitude of the first complex function to a desired form, that is, A, and then propagating the first complex function toward the reference plane of an SLM (S640).

A third complex function may be obtained by changing a phase of the second complex function to a desired form, that is, 0, and then propagating the second complex function toward the object plane (S650).

Next, whether an amplitude value of the third complex function is the same as the desired amplitude value A may be determined (S660). A reference (e.g., a threshold) for determining that the amplitude value of the third complex function is the same as the amplitude value A may be configured. For example, a reference based on which it may be determined that an amplitude hologram which may be assigned to the amplitude modulation SLM is derived may be appropriately configured, based on the amplitude value of the third complex function.

When it is not determined that the amplitude of the third complex function is the same as the desired amplitude value A, which is to be displayed on the corresponding object plane, the third complex function calculated in operation S650 may be used as the first complex function, and operations S640, S650, and S660 may be repeated.

When it is determined that the amplitude of the third complex function is the same as the desired amplitude value A, which is to be displayed on the corresponding object plane, the third complex function calculated in operation S650 may be determined as a function corresponding to the hologram image data to be displayed on the object plane. A calculation of propagating the finally determined third complex function toward the reference plane of the SLM may be performed. The calculated complex function may include an imaginary part that is 0 or very close to 0, and by taking a real part, a (amplitude-only) CGH having a phase of 0 may be obtained (S670).

This process may be repeated by changing the object plane and may be performed with respect to all object planes.

Operations S630 through S660 of FIG. 8 may be expressed as illustrated in FIG. 9. The first complex function that is arbitrarily configured on the object plane may be expressed as C'(x,y). Next, the second complex function may be obtained by propagating the complex function $(A(x,y)e^{i \cdot angle[C'(x,y)]})$ toward the reference plane, wherein the complex function $(A(x,y)e^{i \cdot angle[C'(x,y)]})$ is obtained by changing the amplitude of the first complex function to a desired amplitude value A(x,y) and intactly using a phase. The second complex function may be expressed as $Prop_{-d}[A(x,y)e^{i \cdot angle[C'(x,y)]}]$.

The third complex function C(x,y) may be obtained by propagating a complex function toward the object plane again, wherein the complex function is obtained by changing the second complex function to have a desired phase value of 0 on the reference plane. The third complex function C(x,y) may be expressed as $Prop_d[|prop_{-d}[A(x,y)e^{i \cdot angle[C'(x,y)]}]|]$.

When the amplitude of the third complex function is not the desired amplitude value A(x,y), the third complex function C(x,y) may be used again as C'(x,y), and the described process may be repeated.

The CGH calculation used in the method described above may include a fast Fourier transform (FFT) calculation, and for example, may include a Fresnel transform method, a generalized Fresnel transform (GFT) method, and high speed FFT methods.

In the method described above, the calculation performed by the CGH generator 350 may include a gradient descent method and an iFTA method to provide the hologram having a phase of 0 on the reference plane of the SLM. Also, in addition to these methods, an algorithm using deep learning, etc. may also be used.

Figure 10:
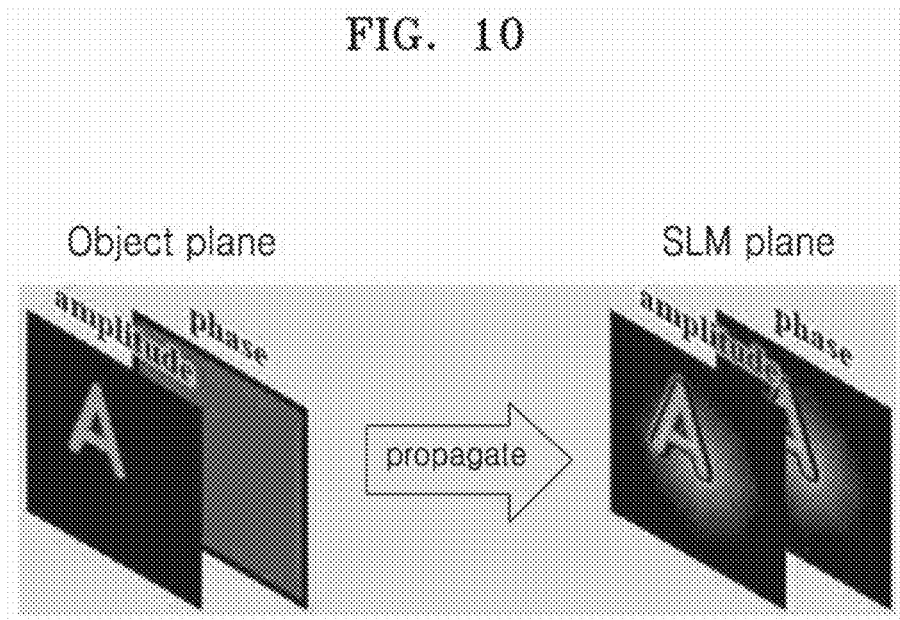
FIG. 10 is a schematic conceptual diagram of a method of generating a CGH, according to a comparative embodiment.

FIG. 10 is a schematic conceptual diagram of a method of generating a CGH, according to a comparative embodiment.

Unlike the method used according to an embodiment, according to the method of generating the CGH according to the comparative embodiment, hologram image data displayed on an object plane includes only an amplitude and a phase thereof is configured as 0. A complex function obtained by propagating a complex function corresponding to this data toward a reference plane of an SLM, SLM plane, may include both an amplitude component and a phase component. Thus, an intended image may be reproduced on the object plane only when both of the amplitude component and the phase component are realized well in the SLM. However, the amplitude modulation and the phase modulation may not be simultaneously and appropriately realized in the general SLM, and an additional optical process may have to be performed for reproducing the intended image. For example, an additional optical system for spatial filtering may be needed, and accordingly, a volume may be increased, and the light efficiency may be greatly decreased due to optical processing.

The CGH generator according to an embodiment may generate an amplitude-only hologram, which is suitable to be assigned to the amplitude modulation SLM, and thus, an optical system may be simplified, and the light efficiency may be increased.

Hologram data generated by the CGH generator 350 may be converted into an electrical signal that is appropriate to be applied to the SLM 200 and may be applied to the SLM 200.

Figure 11:
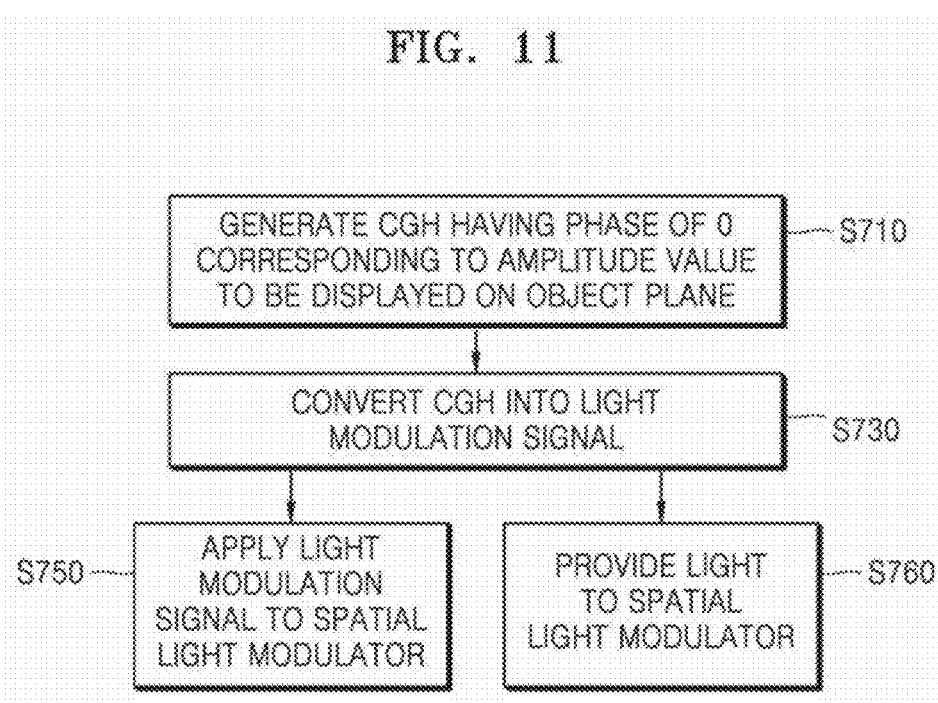
FIG. 11 is a schematic flowchart of a process of displaying an image via a holographic display apparatus according to an embodiment.

FIG. 11 is a schematic flowchart of a process of displaying an image via a holographic display apparatus according to an embodiment.

A CGH having a phase of 0 corresponding to an amplitude value to be displayed on an object plane may be generated (S710). This process may be performed by the CGH generator 350 according to the method described with reference to FIGS. 4 through 9.

A hologram generated by the CGH generator 350 may be converted into a light modulation signal to be applied to the SLM (S730). The processor may form an electrical signal for forming a CGH calculated as described above at each location of the SLM. In other words, the hologram data may be converted into an electrical signal which may indicate a brightness (amplitude) corresponding to the hologram data by adjusting a transmittance of each location of the SLM.

The light modulation signal may be applied to the SLM (S750), and simultaneously, light for reproducing a hologram may be provided to the SLM (S760). Accordingly, a 3D image with respect to an object may be reproduced on a predetermined spatial location.

The method, performed by the CGH generator 350, of generating the hologram and the holographic display apparatus 1000 including the CGH generator 350, described above, may be applied to various electronic devices, such as a monitor, a TV, a mobile display apparatus, a mobile communication device, a smartphone, etc.

The method, performed by the CGH generator 350, of generating the hologram, described above, may be realized as processor-readable code on various processor-readable recording media. The processor-readable recording media may include all types of recording devices in which processor-readable data is stored. Examples of the processor-readable recording media may include ROM, RAM, a CD-ROM, magnetic tape, a floppy disk, an optical data storage, etc. Also, the processor-readable recording media may also be realized in the form of a carrier wave, such as transmission through the Internet. Also, the processor-readable recording media may be distributed in a computer system connected through a network and may store and execute the processor-readable code in a distributed fashion.

The holographic display apparatus described above may be realized in the form of a wearable device, for example, as a glasses-type device. The holographic display apparatus may be applied to a virtual reality (VR) device. The holographic display apparatus may also be applied to an augmented reality (AR) device providing an image containing additional information combined with ambient light regarding a real environment.

Figure 12:
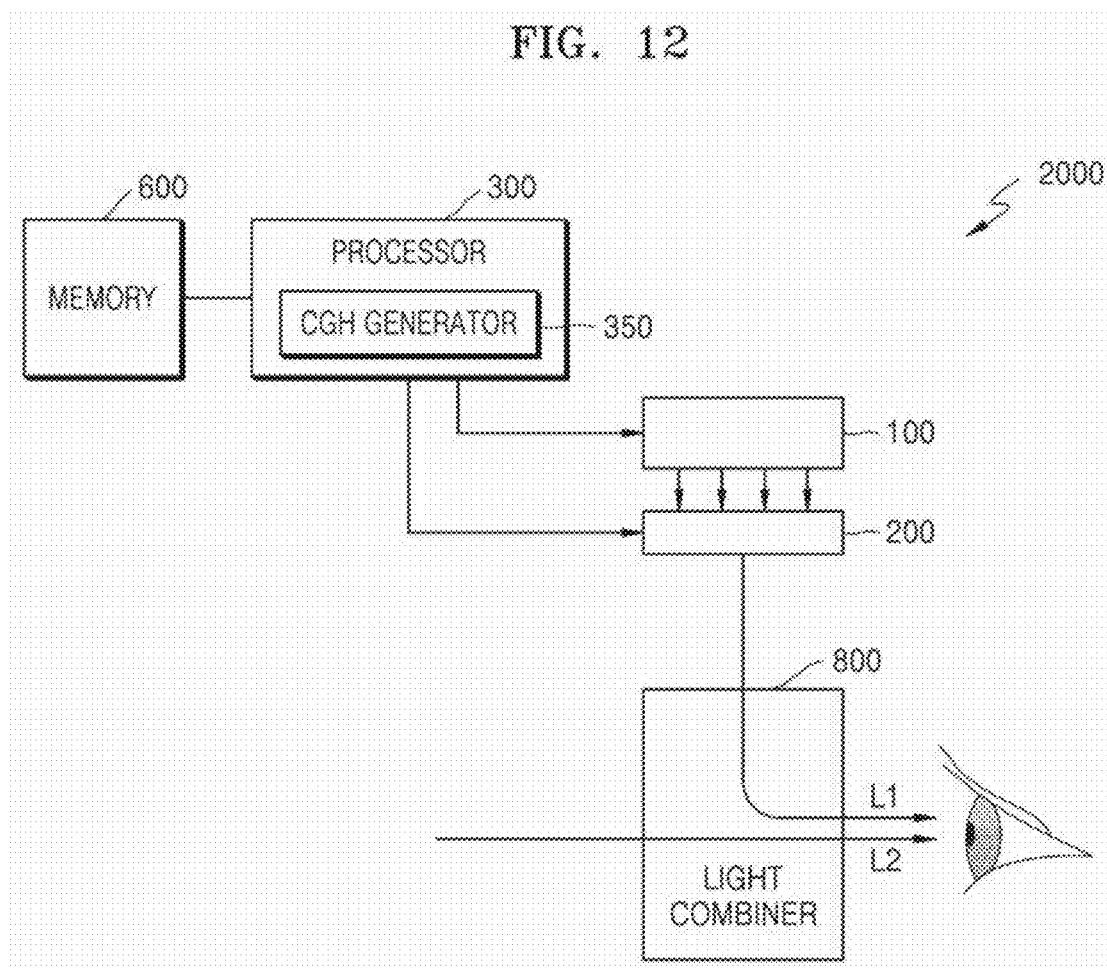
FIG. 12 is a schematic conceptual diagram of a structure of an augmented reality (AR) device according to an embodiment.

FIG. 12 is a schematic conceptual diagram of a structure of an AR device 2000 according to an embodiment.

The AR device 2000 may include the light source portion 100, the SLM 200, the processor 300, and a light combiner 800.

The processor 300 may include the CGH generator 350, and the CGH generator 350 may generate an amplitude-only hologram to be assigned to the SLM 200, as described above.

The light combiner 800 may be configured to combine image light L1 based on a CGH with ambient light L2 and provide the combined image to an eye of a user. The light combiner 800 is transparent with respect to the ambient light L2 incident in a first direction and may change a path of the image light L1 which is incident in a second direction that is different from the first direction, to a direction that is parallel with the first direction. The light combiner 800 may have various known shapes and structures for realizing the function described above, and may include, for example, one or more from among a beam splitter, a lens, a polarizer, a phase delay member, etc.

The AR device 2000 may be a display apparatus configured to further increase the effect of reality by adding a virtual object or information on an environment of a real world. For example, based on a location of a viewer, additional information with respect to an environment provided by a real world may be formed by an image forming portion and provided to the viewer. This AR display may be applied to a ubiquitous environment or an Internet of things (IoT) environment.

The image of a real world is not limited to a real environment. For example, the image of the real world may include an image formed by another imaging device. Thus, the AR device described above may be applied to a multi-image display apparatus simultaneously showing two images.

The AR device 2000 is illustrated as an optical system provided to a single eye. However, the AR device 2000 is not limited thereto and may be realized as an optical system separately provided for each of both eyes.

The holographic display apparatuses described above may be formed as wearable types. For example, all or part of components of the holographic display apparatuses may be formed as wearable types.

Figure 13:
FIGS. 13 through 15 are diagrams of exterior shapes of various electronic devices implementing a holographic display apparatus according to an embodiment.
Figure 14:
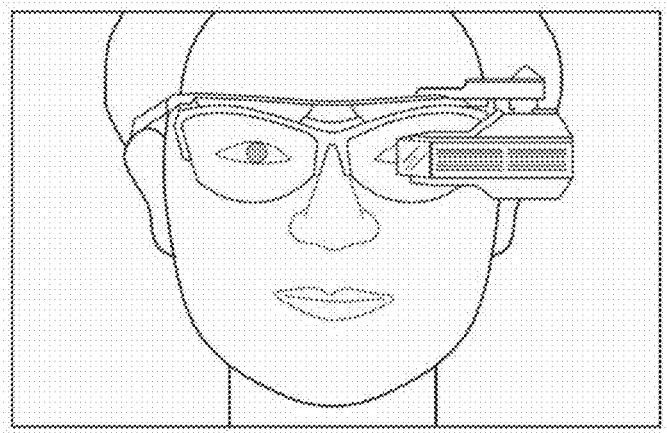
Figure 15:
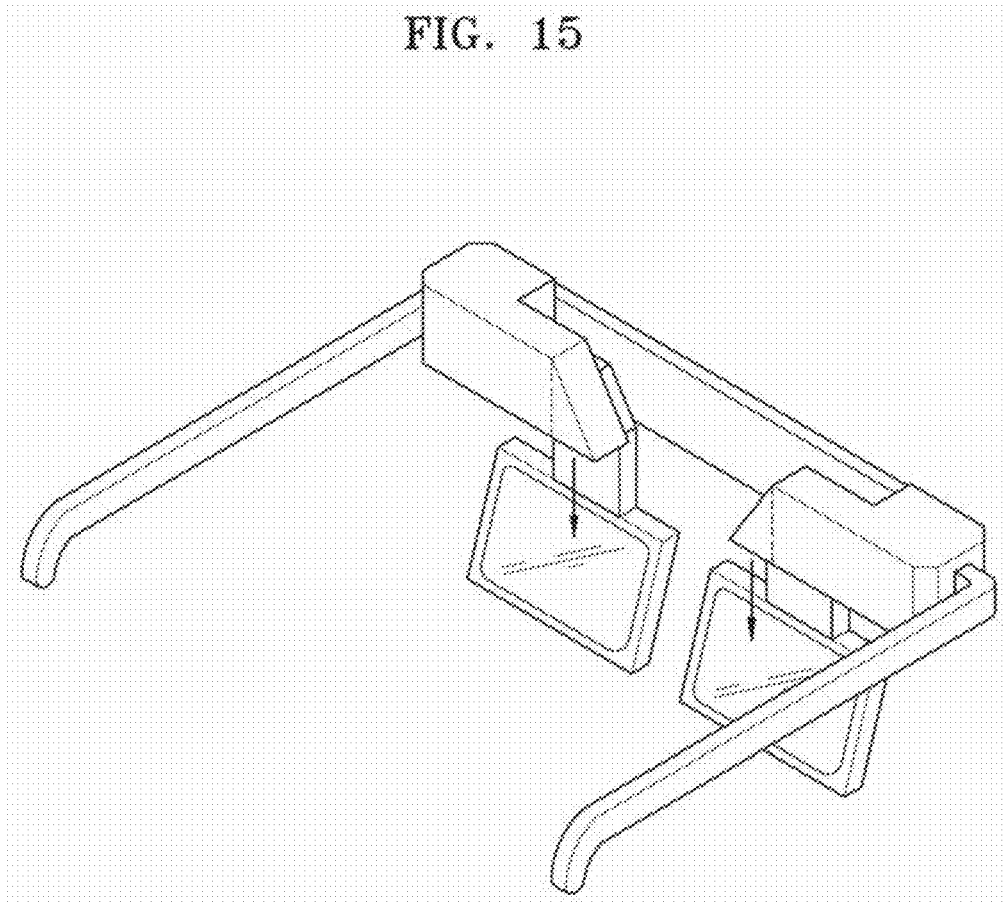

FIGS. 13 through 15 are diagrams of various electronic devices implementing a holographic display apparatus according to an embodiment. As illustrated in FIGS. 13 through 15, the holographic display apparatus may be applied to wearable devices. For example, the holographic display apparatus may be applied to a head-mounted display (HMD). Also, the holographic display apparatus may be applied to a glasses-type display, a goggle-type display, etc. The wearable electronic devices illustrated in FIGS. 13 through 15 may operate in synchronization with a smartphone. These holographic display apparatuses may be head mount-type, glasses-type, or goggle-type VR, AR, or MR display apparatuses, which may provide VR or a virtual image together with an external actual image.

Also, the holographic display apparatus may be provided in a smartphone, or the smartphone may be directly used as the holographic display apparatus. In other words, the holographic display apparatus may be applied to a small electronic device (a mobile electronic device), rather than to the wearable devices illustrated in FIGS. 13 through 15.

Figure 16:
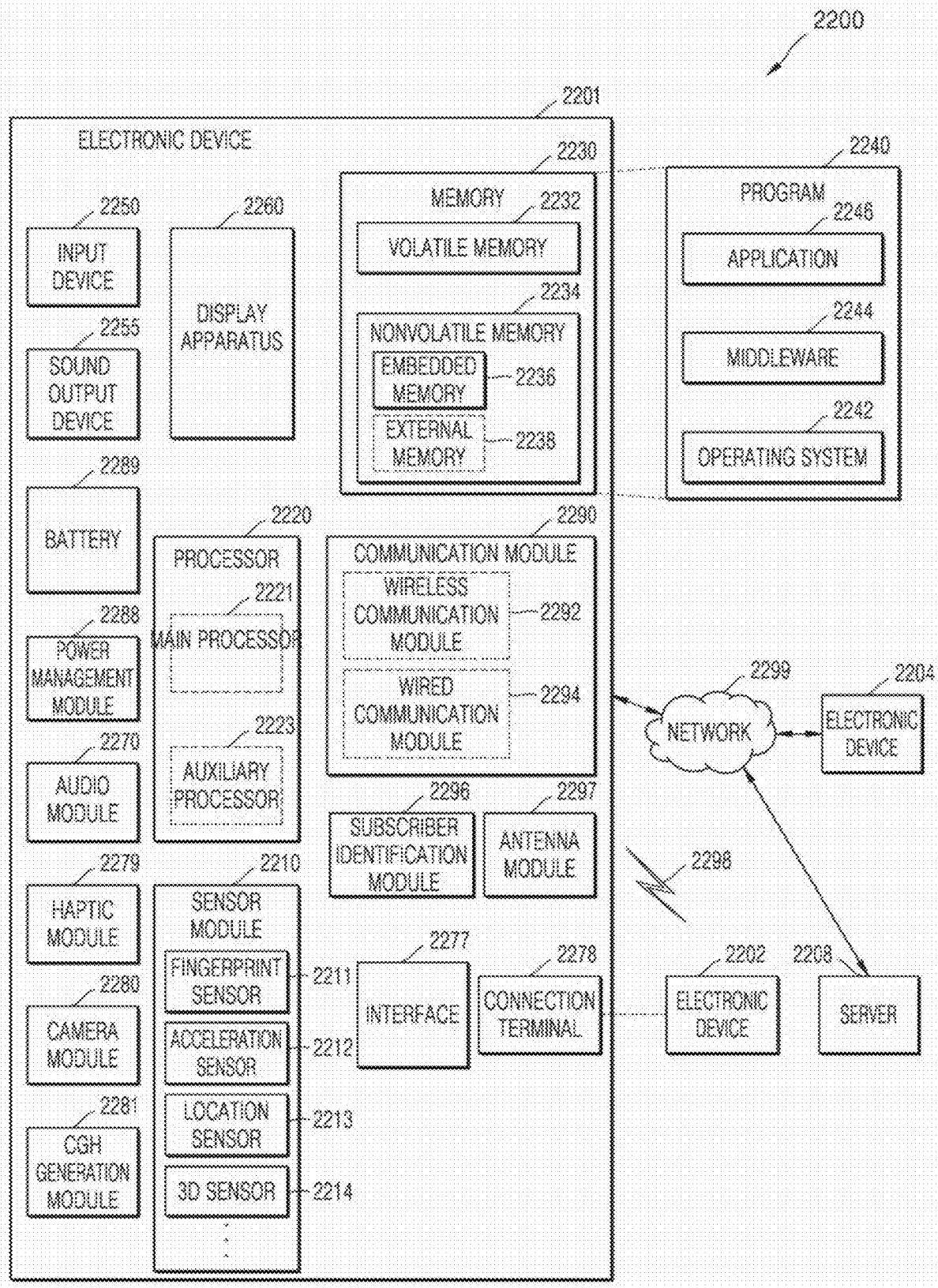
FIG. 16 is a block diagram of an electronic device according to an embodiment.

FIG. 16 is a schematic block diagram of components of an electronic device 2201 according to an embodiment.

Referring to FIG. 16, the electronic device 2201 in a network environment 2200 may communicate with another electronic device 2202 through a first network 2298 (a short-range wireless communication network, etc.) or may communicate with another electronic device 2204 and/or a server 2208 through a second network 2299 (a remote wireless communication network, etc.). The electronic device 2201 may communicate with the electronic device 2204 through the server 2208. The electronic device 2201 may include a processor 2220, a memory 2230, an input device 2250, a sound output device 2255, a display apparatus 2260, an audio module 2270, a sensor module 2210, an interface 2277, a connection terminal 2278, a haptic module 2279, a camera module 2280, a power management module 2288, a battery 2289, a communication module 2290, a subscriber identification module 2296, and/or an antenna module 2297. The electronic device 2201 may omit one or more of the components or may further include other components. One or more of the components may be realized as an integrated circuit. For example, a fingerprint sensor 2211, an iris sensor, an illumination sensor, etc. of the sensor module 2210 may be embedded in the display apparatus 2260 (a display, etc.).

The processor 2220 may be configured to execute software (a program 2240, etc.) to control one or more components (hardware or software components) of the electronic device 2201, the components being connected to the processor 2220, and to perform various data processing or calculations. As part of the data processing or calculations, the processor 2220 may be configured to load a command and/or data received from other components (the sensor module 2210, the communication module 2290, etc.) into a volatile memory 2232, process the command and/or the data stored in the volatile memory 2232, and store resultant data in a nonvolatile memory 2234. The processor 2220 may include a main processor 2221 (a CPU, an AP, etc.) and an auxiliary processor 2223 (a GPU, an image signal processor, a sensor hub processor, a communication processor, etc.) which may independently operate or operate with the main processor 2221. The auxiliary processor 2223 may use less power than the main processor 2221 and may perform specialized functions.

When the main processor 2221 is in an inactive state (a sleep state), the auxiliary processor 2223 may take charge of an operation of controlling functions and/or states related to one or more components (the display apparatus 2260, the sensor module 2210, the communication module 2290, etc.) from among the components of the electronic device 2201, or when the main processor 2221 is in an active state (an application execution state), the auxiliary processor 2223 may perform the same operation along with the main processor 2221. The auxiliary processor 2223 (the image signal processor, the communication processor, etc.) may be realized as part of other functionally-related components (the camera module 2280, the communication module 2290, etc.).

The memory 2230 may store various data required by the components (the processor 2220, the sensor module 2210, etc.) of the electronic device 2201. The data may include, for example, software (the program 2240, etc.), input data and/or output data of a command related to the software. The memory 2230 may include the volatile memory 2232 and/or the nonvolatile memory 2234.

The program 2240 may be stored in the memory 2230 as software, and may include an operating system 2242, middleware 2244, and/or an application 2246.

The input device 2250 may receive a command and/or data to be used by the components (the processor 2220, etc.) of the electronic device 2201 from the outside (a user, etc.) of the electronic device 2201. The input device 2250 may include a microphone, a mouse, a keyboard, and/or a digital pen (a stylus pen, etc.).

The sound output device 2255 may output a sound signal to the outside of the electronic device 2201. The sound output device 2255 may include a speaker and/or a receiver. The speaker may be used for a general purpose, such as multimedia playing or recording playing, and the receiver may be used to receive an incoming call. The receiver may be coupled to the speaker as part of the speaker or may be realized as a separate device.

The display apparatus 2260 may visually provide information to the outside of the electronic device 2201. The display apparatus 2260 may include a display, a hologram device, or a controlling circuit for controlling a projector and a corresponding device. The display apparatus 2260 may include touch circuitry configured to sense a touch operation and/or sensor circuitry (a pressure sensor, etc.) configured to measure an intensity of a force generated by the touch operation. The display apparatus 2260 may include the holographic display apparatus 1000 described above. In this case, the CGH generator 350 included in the holographic display apparatus 1000 may be realized as a CGH generation module 2281.

The CGH generation module 2281 may generate an amplitude-only hologram having a phase of 0, which is to be provided to a reference plane of an SLM included in the display apparatus 2260, according to the method described above.

The audio module 2270 may convert sound into an electrical signal or an electrical signal into sound. The audio module 2270 may obtain sound via the input device 2250 or may output sound via the sound output device 2255 and/or a speaker and/or a headphone of an electronic device (the electronic device 2202, etc.) directly or wirelessly connected to the electronic device 2201.

The sensor module 2210 may sense an operation state (power, temperature, etc.) of the electronic device 2201 or an external environmental state (a user state, etc.) and generate electrical signals and/or data values corresponding to the sensed state. The sensor module 2210 may include a fingerprint sensor 2211, an acceleration sensor 2212, a location sensor 2213, a 3D sensor 2214, etc., and may also include an iris sensor, a gyro sensor, an atmospheric sensor, a magnetic sensor, a grip sensor, a proximity sensor, a color sensor, an infrared (IR) sensor, a biometric sensor, a temperature sensor, a humidity sensor, and/or an illuminance sensor.

The interface 2277 may support one or more designated protocols to be used for the electronic device 2201 to be directly or wirelessly connected to another electronic device (the electronic device 2202, etc.). The interface 2277 may include a high-definition multimedia interface (HDMI) interface, a universal serial bus (USB) interface, an SD card interface, and/or an audio interface.

The connection terminal 2278 may include a connector, through which the electronic device 2201 may be physically connected to another electronic device (the electronic device 2202, etc.). The connection terminal 2278 may include an HDMI connector, a USB connector, an SD card connector, and/or an audio connector (a headphone connector, etc.).

The haptic module 2279 may convert an electrical signal into a mechanical stimulus (vibration, motion, etc.) or an electrical stimulus which is recognizable to a user via haptic or motion sensation. The haptic module 2279 may include a motor, a piezoelectric device, and/or an electrical stimulus device.

The camera module 2280 may capture a still image and a video. The camera module 2280 may include a lens assembly including one or more lenses, image sensors, image signal processors, and/or flashes.

The power management module 2288 may manage power supplied to the electronic device 2201. The power management module 2288 may be realized as part of a power management integrated circuit (PMIC).

The battery 2289 may supply power to the components of the electronic device 2201. The battery 2289 may include a non-rechargeable primary battery, rechargeable secondary battery, and/or a fuel battery.

The communication module 2290 may support establishment of direct (wired) communication channels and/or wireless communication channels between the electronic device 2201 and other electronic devices (the electronic device 2202, the electronic device 2204 the server 2208, etc.) and communication performance through the established communication channels. The communication module 2290 may include one or more communication processors separately operating from the processor 2220 (an application processor, etc.) and supporting direct communication and/or wireless communication. The communication module 2290 may include a wireless communication module 2292 (a cellular communication module, a short-range wireless communication module, a global navigation satellite system (GNSS) communication module, and/or a wired communication module 2294 (a local area network (LAN) communication module, a power line communication module, etc.). From these communication modules, a corresponding communication module may communicate with other electronic devices through the first network 2298 (a short-range wireless communication network, such as Bluetooth, Wifi direct, or infrared data association (IrDa)) or the second network 2299 (a remote communication network, such as a cellular network, the Internet, or a computer network (LAN, WAN, etc.)). Various types of communication modules described above may be integrated as a single component (a single chip, etc.) or realized as a plurality of components (a plurality of chips). The wireless communication module 2292 may identify and authenticate the electronic device 2201 within the first network 2298 and/or the second network 2299 by using subscriber information (international mobile subscriber identification (IMSI), etc.) stored in the subscriber identification module 2296.

The antenna module 2297 may transmit a signal and/or power to the outside (other electronic devices, etc.) or receive the same from the outside. The antenna may include an emitter including a conductive pattern formed on a substrate (a printed circuit board (PCB), etc.). The antenna module 2297 may include an antenna or a plurality of antennas. When the antenna module 2297 includes a plurality of antennas, an appropriate antenna which is suitable for a communication method used in the communication networks, such as the first network 2298 and/or the second network 2299, may be selected from among the plurality of antennas by the communication module 2290. Through the selected antenna, signals and/or power may be transmitted or received between the communication module 2290 and other electronic devices. In addition to the antenna, another component (a radio frequency integrated circuit (RFIC), etc.) may be included in the antenna module 2297.

One or more of the components of the electronic device 2201 may be connected to one another and exchange signals (commands, data, etc.) with one another, through communication methods performed among peripheral devices (a bus, general purpose input and output (GPIO), a serial peripheral interface (SPI), a mobile industry processor interface (MIPI), etc.).

The command or the data may be transmitted or received between the electronic device 2201 and another external electronic device, that is, the electronic device 2204, through the server 2208 connected to the second network 2299. Other electronic devices, that is, the electronic devices 2202 and 2204, may be electronic devices that are homogeneous or heterogeneous types with respect to the electronic device 2201. All or part of operations performed by the electronic device 2201 may be performed by one or more of the other electronic devices, that is, the electronic devices 2202 and 2204 and the server 2208. For example, when the electronic device 2201 has to perform a function or a service, instead of directly performing the function or the service, the one or more other electronic devices may be requested to perform part or all of the function or the service. The one or more other electronic devices receiving the request may perform an additional function or service related to the request and may transmit a result of the execution to the electronic device 2201. To this end, cloud computing, distribution computing, and/or client-server computing techniques may be used.

In addition, an application field of the holographic display apparatus may be variously modified. For example, the holographic display apparatus may not only be applied to realize VR, AR, or MR, or but may also be applied to other fields. For example, the holographic display apparatus may be applied to a small television or a small monitor which may be worn by a user.

The CGH generator included in the holographic display apparatus described above may generate an amplitude hologram that is suitable to be assigned to the amplitude modulation SLM.

The holographic display apparatus described above may have a simple optical system structure and may achieve high light efficiency.

The holographic display apparatus described above may be implemented in various electronic devices, such as an AR device, etc.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A holographic display apparatus comprising:
   a light source;
   a spatial light modulator configured to modulate light from the light source according to an image to be displayed on an object plane; and
   a processor configured to generate a computer generated hologram (CGH) in which a phase value of hologram data to be displayed on a reference plane of the spatial light modulator is 0, the processor being configured to apply a light modulation signal based on the CGH to the spatial light modulator,
   wherein the processor is further configured to repeatedly change a phase value of hologram image data of a hologram image to be displayed on the object plane and search for a value via which the phase of the hologram data on the reference plane of the spatial light modulator becomes 0.

2. The holographic display apparatus of claim 1,
   wherein the spatial light modulator comprises an amplitude modulation spatial light modulator.

3. The holographic display apparatus of claim 1,
   wherein the object plane comprises a plurality of object planes obtained by segmenting an object image in a depth direction, and
   wherein the processor is further configured to generate the CGH by propagating a complex function corresponding to a respective hologram image to be displayed on each of the plurality of object planes toward the reference plane of the spatial light modulator.

4. The holographic display apparatus of claim 1,
   wherein the processor is further configured to use a gradient descent method to repeatedly change the phase value of the hologram image data to be displayed on the object plane and search for the value via which the phase of the hologram data on the reference plane of the spatial light modulator becomes 0.

5. The holographic display apparatus of claim 1,
   wherein the processor is further configured to:
   configure a first complex function comprising an amplitude A corresponding to the hologram image to be displayed on the object plane and an arbitrary phase value $\varphi$ to be assigned to the amplitude A;
   calculate a second complex function obtained by propagating, toward the reference plane, the first complex function;
   extract an imaginary part of the second complex function;
   calculate a loss value indicating a difference between the imaginary part and 0; and
   correct the arbitrary phase value $\varphi$ such that the loss value is minimized.

6. The holographic display apparatus of claim 5,
   wherein the correcting of the phase value $\varphi$ is repeatedly performed according to a gradient descent method.

7. The holographic display apparatus of claim 6,
   wherein the processor is further configured to:
   calculate a third complex function obtained by propagating, toward the reference plane, a complex function in which a final phase value $\varphi$ determined by correcting the phase value $\varphi$ a plurality of times is assigned to the amplitude A; and
   extract a real part from the third complex function.

8. The holographic display apparatus of claim 7, wherein the processor is further configured to convert the real part into the light modulation signal and apply the light modulation signal to the spatial light modulator.

9. A holographic display apparatus comprising:
a light source;
a spatial light modulator configured to modulate light from the light source according to an image to be displayed on an object plane; and
a processor configured to generate a computer generated hologram (CGH) in which a phase value of hologram data to be displayed on a reference plane of the spatial light modulator is 0, the processor being configured to apply a light modulation signal based on the CGH to the spatial light modulator,
wherein the processor is further configured to:
repeatedly change an amplitude value of the hologram data to be displayed on the reference plane;
obtain a complex function by propagating the repeatedly changed amplitude value toward the object plane; and
search for a value via which an amplitude of the complex function becomes equal to an amplitude value of hologram image data to be displayed on the object plane.

10. The holographic display apparatus of claim 9, wherein the processor is further configured to use a gradient descent method to repeatedly change the amplitude value of the hologram data to be displayed on the reference plane obtain the complex function by propagating the repeatedly changed amplitude value toward the object plane, and search for the value via which the amplitude of the complex function becomes equal to the amplitude value of the hologram image data to be displayed on the object plane.

11. The holographic display apparatus of claim 9, wherein the processor is further configured to:
configure a fourth complex function comprising an arbitrary amplitude A' as the hologram data to be displayed on the reference plane;
calculate a fifth complex function obtained by propagating, toward the object plane, the fourth complex function in which a phase value of 0 is assigned to the arbitrary amplitude A';
calculate a loss value with respect to a difference between an amplitude of the fifth complex function and the amplitude value of the hologram image data to be displayed on the object plane; and
correct the arbitrary amplitude A' such that the loss value is minimized.

12. The holographic display apparatus of claim 11, wherein the correcting of the arbitrary amplitude A' is repeatedly performed according to a gradient descent method.

13. The holographic display apparatus of claim 12, wherein the processor is further configured to convert a final amplitude value A' determined by correcting the arbitrary amplitude A' a plurality of times into the light modulation signal and apply the light modulation signal to the spatial light modulator.

14. A holographic display apparatus comprising:
a light source;
a spatial light modulator configured to modulate light from the light source according to an image to be displayed on an object plane; and
a processor configured to generate a computer generated hologram (CGH) in which a phase value of hologram data to be displayed on a reference plane of the spatial light modulator is 0, the processor being configured to apply a light modulation signal based on the CGH to the spatial light modulator,
wherein the processor is further configured to search for a complex function of the object plane, via which the phase of the hologram data to be displayed on the reference plane of the spatial light modulator becomes 0, according to an iterative Fourier transform algorithm (iFTA) method.

15. The holographic display apparatus of claim 14, wherein the processor is further configured to:
configure an arbitrary first complex function as hologram data to be displayed on the object plane;
calculate a second complex function by changing an amplitude of the arbitrary first complex function to a predetermined amplitude A and propagating the changed arbitrary first complex function toward the reference plane;
calculate a third complex function by changing a phase of the second complex function to 0 and propagating the second complex function toward the object plane; and
compare an amplitude of the third complex function with the predetermined amplitude A.

16. The holographic display apparatus of claim 15, wherein the processor is further configured to, when the amplitude of the third complex function is different from the predetermined amplitude A, use the third complex function as another first complex function and perform a calculation of another second complex function and a calculation of another third complex function.

17. The holographic display apparatus of claim 15, wherein the processor is further configured to, when the amplitude of the third complex function is equal to the predetermined amplitude A, calculate the complex function obtained by propagating the third complex function toward the reference plane.

18. The holographic display apparatus of claim 17, wherein the processor is further configured to convert a real part of the calculated complex function into the light modulation signal and apply the light modulation signal to the spatial light modulator.

19. The holographic display apparatus of claim 1, further comprising a field lens arranged between the spatial light modulator and the object plane.

20. The holographic display apparatus of claim 1, wherein the holographic display apparatus comprises a glasses-type apparatus.

21. An electronic device comprising the holographic display apparatus of claim 1.

22. An augmented reality device comprising:
the holographic display apparatus of claim 1; and
an optical combiner configured to combine image light via the holographic display apparatus with ambient light and provide the combined light to an eye of a user.

23. The augmented reality device of claim 22, wherein the optical combiner is transparent with respect to the ambient light incident in a first direction and is configured to change a path of the image light, which is incident in a second direction that is different from the first direction, to a direction parallel to the first direction.

24. A holographic display apparatus comprising:
a coherent light source;
an amplitude modulation spatial light modulator (SLM) configured to modulate coherent light incident from the coherent light source; and
a processor configured to:
receive object amplitude data of an image to be displayed at an object plane;
calculate object phase data of the image to be displayed at the object plane such that reference phase data of a computer generated hologram (CGH) applied to the amplitude modulation SLM is substantially equal to zero;
generate the CGH comprising the reference phase data; and
apply the CGH to the amplitude modulation SLM to display the image at the object plane,
wherein the calculating the object phase data comprises:
generating a first complex function comprising an initial arbitrary value as the object phase data; and
performing an iterative process comprising:
generating a second complex function by propagating the first complex function to a reference plane of the amplitude modulation SLM;
determining whether phase data of the second complex function is substantially equal to zero; and
based on the phase data of the second complex function not being substantially equal to zero, generating a third complex function comprising corrected phase data based on the phase data of the second complex function and repeating the iterative process using the third complex function as the first complex function.

25. The holographic display apparatus of claim 24, wherein the iterative process further comprises:
based on the phase data of the second complex function being substantially equal to zero, determining the phase data of the most recently generated second complex function as the object phase data.

* * * * *